United States Patent
Nakatsugawa

(10) Patent No.: US 6,470,012 B2
(45) Date of Patent: *Oct. 22, 2002

(54) COMMUNICATION SYSTEM AND DATA-FORMAT TO BE USED IN THE SAME

(75) Inventor: Yoshinori Nakatsugawa, Susono (JP)

(73) Assignee: Yazaki Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/065,461

(22) Filed: Apr. 24, 1998

(65) Prior Publication Data

US 2002/0057689 A1 May 16, 2002

(30) Foreign Application Priority Data

Apr. 25, 1997 (JP) .............................................. 9-109690
Jul. 23, 1997 (JP) .............................................. 9-197414

(51) Int. Cl.⁷ .............................................. H04L 12/56
(52) U.S. Cl. ...................................... 370/392; 370/403
(58) Field of Search ................................ 370/392, 254, 370/363, 368, 371, 374, 379, 381, 382, 384, 389, 393, 396, 397, 398, 399, 400, 401, 402, 403, 404, 405, 406, 407, 409, 465, 474

(56) References Cited

U.S. PATENT DOCUMENTS

| | | | |
|---|---|---|---|
| 4,797,881 A | * | 1/1989 | Ben-Artzi ...................... 370/4 |
| 4,933,937 A | * | 6/1990 | Konishi ...................... 370/404 |
| 5,140,585 A | | 8/1992 | Tomikawa |
| 5,222,064 A | | 6/1993 | Sagawa |
| 5,402,419 A | * | 3/1995 | Osakabe et al. ............ 370/392 |
| 6,084,631 A | * | 7/2000 | Tonkin et al. .............. 348/212 |

FOREIGN PATENT DOCUMENTS

| | | |
|---|---|---|
| EP | 0 511 794 | 11/1992 |
| EP | 0 517 534 | 12/1992 |
| JP | 6-290132 | 10/1994 |

* cited by examiner

Primary Examiner—Steven Nguyen
(74) Attorney, Agent, or Firm—Oblon, Spivak, McClelland, Maier & Neustadt, P.C.

(57) ABSTRACT

A communication system includes a plurality of repeating devices connected with each other through a data transmitting path. One or more node terminals are connected to each repeating device. In a communication frame of communication data to be sent, an address description area is provided to describe either one of a terminal address of the node terminal related to the communication data and a device address of the repeating device also related to the communication data. In case of data communication between one node terminal and the other node terminal, the respective addresses of the node terminals are described in the address description area to designate a sender and a destination. Owing to the provision of the address description area, it is possible to certainly transmit the communication data from the sender to the nominated destination without reducing data volume transmitted per unit time.

22 Claims, 5 Drawing Sheets

EXAMPLE OF SENDER/DESTINATION DESCRIPTION AREA

| H | b7 | b6 | b5 | b4 | b3 | b2 | b1 | b0 |
|---|----|----|----|----|----|----|----|----|

FIG.5

| CODES OF SORTS | SORTS OF FUNCTIONAL INSTRUMENTS |
|---|---|
| 00 | MONITOR 1 |
| 03 | NAVIGATION (NV) |
| 0D | DVD-ROM |
| 0E | MONITOR 2 |
| 0F | MONITOR 3 |
| 11 | DAT |
| 12 | CD |
| 15 | MD |
| 16 | VICS |
| 17 | ETC |
| 1A | CD-ROM |
| 1F | UNDEFINED |

FIG.6

| CODES OF SORTS (BCD) b7 b6 b5 b4 b3 | | | | | SORTS OF FUNCTIONAL INST. |
|---|---|---|---|---|---|
| 0 | 0 | 0 | 0 | 0 | Video monitor |
| 0 | 0 | 0 | 0 | 1 | Audio amplifier |
| 0 | 0 | 0 | 1 | 0 | Switch box |
| 0 | 0 | 0 | 1 | 1 | Reserved for future standardization |
| 0 | 0 | 1 | 0 | 0 | Video cassette recorder |
| 0 | 0 | 1 | 0 | 1 | TV reception system |
| 0 | 0 | 1 | 1 | 0 | Video disk player |
| 0 | 0 | 1 | 1 | 1 | Camera |
| 0 | 1 | 0 | 0 | 0 | Teletext decoder |
| 0 | 1 | 0 | 0 | 1 | Videotext decoder |
| 0 | 1 | 0 | 1 | 0 | Video printer |
| 0 | 1 | 0 | 1 | 1 | Broadcast fax |
| 0 | 1 | 1 | 0 | 0 | Video effects unit |
| 0 | 1 | 1 | 0 | 1 | Reserved for future standardization |
| 0 | 1 | 1 | 1 | 0 | Reserved for future standardization |
| 0 | 1 | 1 | 1 | 1 | Reserved for future standardization |
| 1 | 0 | 0 | 0 | 0 | Radio tuner |
| 1 | 0 | 0 | 0 | 1 | Audio tape recorder(Cassette Recorder,DAT) |
| 1 | 0 | 0 | 1 | 0 | Audio disk player(Phono, CD) |
| 1 | 0 | 0 | 1 | 1 | Reserved for future standardization |
| 1 | 0 | 1 | 0 | 0 | Audio effects unit |
| 1 | 0 | 1 | 0 | 1 | Reserved for future standardization |
| 1 | 0 | 1 | 1 | 0 | Reserved for future standardization |
| 1 | 0 | 1 | 1 | 1 | Reserved for future standardization |
| 1 | 1 | 0 | 0 | 0 | Personal computer |
| 1 | 1 | 0 | 0 | 1 | Control function for audio and/or video |
| 1 | 1 | 0 | 1 | 0 | CD memory (CD-ROM, CD-I) |
| 1 | 1 | 0 | 1 | 1 | Reserved for future standardization |
| 1 | 1 | 1 | 0 | 0 | Timer |
| 1 | 1 | 1 | 0 | 1 | Reserved for future standardization |
| 1 | 1 | 1 | 1 | 0 | Reserved for future standardization |
| 1 | 1 | 1 | 1 | 1 | Reserved for future standardization |

COMMUNICATION SYSTEM AND DATA-FORMAT TO BE USED IN THE SAME

BACKGROUND OF THE INVENTION

The present invention relates to a communication system for mutually connecting a plurality of repeating devices (or relay devices) each of which has one or more node terminals connected thereto, so that data communication is carried out between one node terminal and the other node terminal, between one repeating device and the other repeating device or between the node terminal and the repeating device. More particularly, it relates to a communication system that, for example, even when the data communication is executed between the node terminals, communication data can be certainly transmitted from one node terminal as a "sender" to another node terminal as a "destination" alias receiver without reducing its data volume transmitted per unit time. Further, the present invention also relates to a data format to be used in such a communication system.

Additionally, the present invention relates to the communication system by which it is possible to simplify an address management therein and allow an additional new node terminal to be communicated with the existing node terminals instantly, thereby providing the communication system which is capable of coping with, namely, "plug and play" function.

Conventionally, there is a known communication system which connects a plurality of repeating devices with each other, each of the repeating devices having one or more node terminals connected thereto, so that data communication can be carried out among the respective node terminals, among the respective repeating devices, or among the node terminals and the repeating devices.

For example, when the communication data is transmitted from one node terminal as the sender to a specific node terminal as the address in the above-mentioned conventional communication system, it has been taken place to provide a communication frame containing commands and data as objects to be transmitted with a sender/destination description area for designating information of the sender and the destination. In detail, in case of designating a sender, both an address of the node terminal as the sender and an additional address of a repeating device involving the specified node terminal are described in the sender/destination description area. Again, in case of designating the destination, both an address of the node terminal as the receiver and an additional address of a repeating device involving the destined node terminal are together described in the sender/destination description area similarly. In this way, the communication data is transmitted from the specified node terminal as the sender to the designated node terminal as the destination in the conventional communication system.

In accordance with such a designating method in the above-mentioned conventional communication system, however, when it is required to exchange data between the node terminals, the addresses of the node terminals and the addresses of the repeating devices involving the node terminals have to be described in the sender/destination description area established in the communication frame. Consequently, since a bit length that the sender/destination description area occupies in the communication data is increased, the conventional method contains a problem of difficulty to increase data transfer quantity per unit time.

SUMMARY OF THE INVENTION

It is therefore an object of the present invention to provide a communication system which is capable of transmitting communication data from a sender to a nominated destination without reducing data volume transmitted per unit time certainly, and a data format used in such a communication system.

It is an additional object to provide a communication system which is capable of simplifying management of addresses stored in the system and bringing a new node terminal, which is intended for additional connection with the repeating device, into its communicable condition instantly, in other words, "plug and play" function.

In accordance with the present invention, there is provided a communication system comprising a plurality of repeating devices each having one or more node terminals connected thereto, the repeating devices being connected with each other through a data transmitting path, whereby data communication is carried out between the node terminals, between the repeating devices, or between the node terminal and the repeating device, the repeating devices each comprising:

terminal address storing means for storing terminal addresses established to inherent values for the node terminals, respectively;

device address storing means for storing a device address established to an inherent value for the repeating device concerned and established to be distinguishable from the terminal addresses; and header information adding means for adding sender/destination information of a sender or a destination to communication data which has been fed from the repeating device concerned or the one or more node terminals connected thereto, the header information adding means further sending the communication data with the sender/destination information toward the data transmitting path;

wherein the sender/destination information added to the communication data by the header information adding means includes either the terminal address stored in the terminal address storing means or the device address stored in the device address storing means.

With the above-mentioned arrangement, in operation, the header information adding means adds the sender/destination information to the communication data transmitted from the repeating device or the node terminal. Thereafter, the header information adding means sends the communication data with the sender/destination information toward the data transmitting path. Since the sender/destination information is constituted by either one of the terminal address stored in the terminal address storing means or the device address stored in the device address storing means, it is possible to shorten a bit length required for designating the address as a whole, comparing with the conventional system where both addresses of the repeating device and the associating node terminal(s) are incorporated to the communication data in order to designate the addresses of the sender/destination. Thus, it is possible to transmit the communication data from the sender to the nominated destination without reducing the data volume transmitted per unit time, certainly.

In accordance with the present invention, there is also provided a communication system comprising a plurality of repeating devices each having one or more node terminals connected thereto, the repeating devices being connected with each other through a data transmitting path, whereby data communication is carried out between the node terminals, between the repeating devices, or between the node terminal and the repeating device, the repeating devices each comprising:

terminal address storing means for storing terminal addresses established to inherent values for the node terminals, respectively;

device address storing means for storing a device address established to an inherent value for the repeating device concerned and established to be distinguishable from the terminal addresses; and header information adding means for adding sender/destination information of a sender or a destination to communication data which has been fed from the repeating device concerned or the one or more node terminals connected thereto, the header information adding means further sending the communication data with the sender/destination information toward the data transmitting path;

wherein the sender/destination information added to the communication data by the header information adding means includes:

an identifier of short bit length, which is used in identifying which of the node terminal and the repeating device the sender or the destination of the communication data is related to; and either one of the terminal address stored in the terminal address storing means and the device address stored in the device address storing means.

In accordance with the present invention, there is also provided a communication system comprising a plurality of repeating devices each having one or more node terminals connected thereto, the repeating devices being connected with each other through a data transmitting path, whereby data communication is carried out between the node terminals, between the repeating devices, or between the node terminal and the repeating device, the repeating devices each comprising:

terminal address storing means for storing terminal addresses established to inherent values for the node terminals, respectively;

device address storing means for storing a terminal address of one node terminal as a device address, the one node terminal being selected from the one or more node terminal in accordance with a predetermined selection rule; and header information adding means for adding sender/destination information of a sender or a destination to communication data which has been fed from the repeating device concerned or the one or more node terminals connected thereto, the header information adding means further sending the communication data with the sender/destination information toward the data transmitting path;

wherein the sender/destination information added to the communication data by the header information adding means includes:

an identifier of short bit length, which is used in identifying which of the node terminal and the repeating device a sender or a destination of the communication data is related to; and either one of the terminal address stored in the terminal address storing means and the device address stored in the device address storing means.

Also in the above-mentioned arrangement, the header information adding means operates to add the sender/destination information to the communication data transmitted from the repeating device or the node terminal. Thereafter, the header information adding means sends the communication data with the sender/destination information toward the data transmitting path. Since the sender/destination information is constituted by the identifier of short bit length, which is used in identifying which of the node terminal or the repeating device the sender or the destination of the communication data does relate to and either the terminal address stored in the terminal address storing means or the device address stored in the device address storing means, it is also possible to shorten a bit length required for designating the address as a whole, comparing with the conventional system where both addresses of the repeating device and the associating node terminal(s) are incorporated to the communication data in order to designate the addresses of the sender/destination. Consequently, it is possible to transmit the communication data from the sender to the nominated destination without reducing the data volume transmitted per unit time, certainly.

In the above-mentioned arrangement, preferably, the predetermined selection rule is established on a basis of a set value of the terminal address optionally.

According to the present invention, there is also provided a data format to be used in a communication system where a plurality of repeating devices each having one or more node terminals connected thereto are connected with each other through a data transmitting path, whereby data communication is carried out between the node terminals, between the repeating devices, or between the node terminal and the repeating device, the data format comprising:

an address description area established in a communication flame for communication data as an object to be transmitted, for describing either a terminal address established to an inherent value for each of the node terminals or a device address established to an inherent value for each of the repeating devices and distinguishable from any terminal address of the node terminals.

Further, there is also provided a data format to be used in a communication system where a plurality of repeating devices each having one or more node terminals connected thereto are connected with each other through a data transmitting path, whereby data communication is carried out between the node terminals, between the repeating devices, or between the node terminal and the repeating device, the data format comprising:

an identifier description area established in a communication flame for communication data as an object to be transmitted, for describing an identifier of short bit length used in identifying which of the node terminal and the repeating device a sender or a destination of the communication data is related to; and an address description area established in the communication frame, for describing either a terminal address established to an inherent value for each of the node terminals or a device address established to an inherent value for each of the repeating devices.

In common with the above-mentioned data formats, it is also possible to shorten a bit length required for designating the address as a whole, comparing with the conventional system where both addresses of the repeating device and the associating node terminal(s) are incorporated to the communication data in order to designate the addresses of the sender/destination. Consequently, it is possible to transmit the communication data from the sender to the nominated destination without reducing the data volume transmitted per unit time, certainly.

In the later data format, preferably, the device address has a terminal address of one node terminal established as a device address, the one node terminal being selected from the one or more node terminals in accordance with a predetermined selection rule.

In this case, owing to the diversion of the terminal address of the selected note terminal, the establishing management for the device terminals can be simplified.

More preferably, the predetermined selection rule is established on a basis of a set value of the terminal address optionally.

According to the present invention, there is also provided a communication system comprising a plurality of repeating devices each having one or more node terminals connected thereto, the repeating devices being connected with each other through a data transmitting path, whereby data communication is carried out between the node terminals, between the repeating devices, or between the node terminal and the repeating device, the repeating devices each comprising:

terminal address storing means for storing terminal addresses established to inherent values for the node terminals, respectively; and communication propriety storing means for storing respective communication propriety conditions as to whether each of the node terminals connected to the repeating device concerned is under its communicable or incommunicable condition;

wherein the terminal addresses stored in the terminal address storing means include a terminal address with respect to an additional node terminal which may be connected to the repeating device concerned additionally, while the communication propriety condition of the additional node terminal stored in the communication propriety storing means is initialized to its incommunicable condition.

In this case, since an inherent terminal address is previously established with respect to the additional node terminal which may be connected to the repeating device concerned additionally and since the communication propriety condition of the additional node terminal is initialized to its incommunicable condition, it is possible to realize the communication system having the simplified address management. Moreover, since the communication system of the invention is constructed irrespective of connection of the additional instruments on the assumption that all of the existing communication terminals including the additional instruments are connected to the system, it is possible to accomplish the design of hardware and software with ease.

In the above-mentioned communication system, preferably, each of the repeating devices further includes:

communication propriety rewriting means for rewriting the communication propriety condition of the additional node terminal from its incommunicable condition to its communicable condition when the additional node terminal is connected to the repeating device concerned.

In operation, when the additional node terminal is connected to the repeating device concerned, then the communication propriety rewriting means rewrites the communication propriety condition of the additional node terminal from the incommunicable condition to the communicable condition. Therefore, even if the additional instruments are additionally connected to the repeating devices after being connected to the communication system, it is possible to eliminate some steps of providing such additional instruments with new addresses and allows the system to recognize each of the additional instruments as one of some functional instruments connected with the repeating devices instantly. As a result, it is possible to realize the communication system which is capable of eliminating the complicated procedure for giving the addresses and bringing the additional instruments into their communicable conditions instantly, namely, effecting the plug and play function.

In the above-mentioned communication system, preferably, each of the repeating devices further comprises incommunicable notice replying means for replying an incommunicable notice representing that the node terminal concerned is under the incommunicable condition toward a sender of the communication data when receiving communication data directed to a node terminal under its incommunicable condition.

According to the present invention, there is also provided a communication system comprising a plurality of repeating devices each having one or more node terminals connected thereto, the repeating devices being connected with each other through a data transmitting path, whereby data communication is carried out between the node terminals, between the repeating devices, or between the node terminal and the repeating device, the repeating devices each comprising:

terminal address storing means for storing terminal addresses established to inherent values for the node terminals, respectively; and communication propriety storing means for storing respective communication propriety conditions as to whether communication terminals including the repeating device and the one or more node terminal connected to the repeating device are under respective communicable or incommunicable conditions;

wherein the terminal addresses stored in the terminal address storing means include a terminal address with respect to an additional node terminal which may be connected to the repeating device concerned additionally, while the communication propriety condition of the additional node terminal stored in the communication propriety storing means is initialized to its incommunicable condition.

Also in this case, since an inherent terminal address is previously established with respect to the additional node terminal which may be connected to the repeating device concerned additionally and since the communication propriety condition of the additional node terminal is initialized to its incommunicable condition, it is possible to realize the communication system having the simplified address management. Moreover, since the communication system of the invention is constructed irrespective of connection of the additional instruments on the assumption that all of the existing communication terminals including the additional instruments are connected to the system, it is possible to accomplish the design of hardware and software with ease.

In the present invention, preferably, each of the repeating devices further comprises:

communication propriety rewriting means for rewriting the communication propriety condition of the additional node terminal from its incommunicable condition to its communicable condition when the additional node terminal is connected to the repeating device concerned.

Similarly, when the additional node terminal is connected to the repeating device concerned, then the communication propriety rewriting means rewrites the communication propriety condition of the additional node terminal from the incommunicable condition to the communicable condition. Therefore, even if the additional instruments are additionally connected to the repeating devices after being connected to the communication system, it is possible to eliminate some steps of providing such additional instruments with new addresses and allows the system to recognize each of the additional instruments as one of some functional instruments connected with the repeating devices instantly. As a result, it is possible to realize the communication system which is capable of eliminating the complicated procedure for giving the addresses and bringing the additional instruments into their communicable conditions instantly, namely, effecting the plug and play function.

More preferably, the communication propriety storing means operates to rewrite the communication propriety condition of the communication terminal concerned, from its communicable condition to its incommunicable condition when any one of the communication terminals falls into its incommunicable condition.

In the above-mentioned communication system, it is also preferable that each of the repeating devices further comprises incommunicable notice replying means for replying an incommunicable notice representing that the node terminal concerned is under the incommunicable condition toward a sender of the communication data when receiving communication data directed to a node terminal under its incommunicable condition.

BRIEF DESCRIPTION OF THE DRAWINGS

FIG. 5 is another diagram for explanation of the invention; and

FIG. 6 is the other diagram for explanation of the invention.

DESCRIPTION OF THE PREFERRED EMBODIMENT

One embodiment in common with a communicating method of the invention, a communication system for executing the method and a data format used in the communication system of the present invention will be described with reference to drawings. Note, we describe the communication system of the invention, it will be explained by an example illustrative of the application on a vehicle network where various functional installations on board are connected with each other through a data transmission path.

Figure 2:
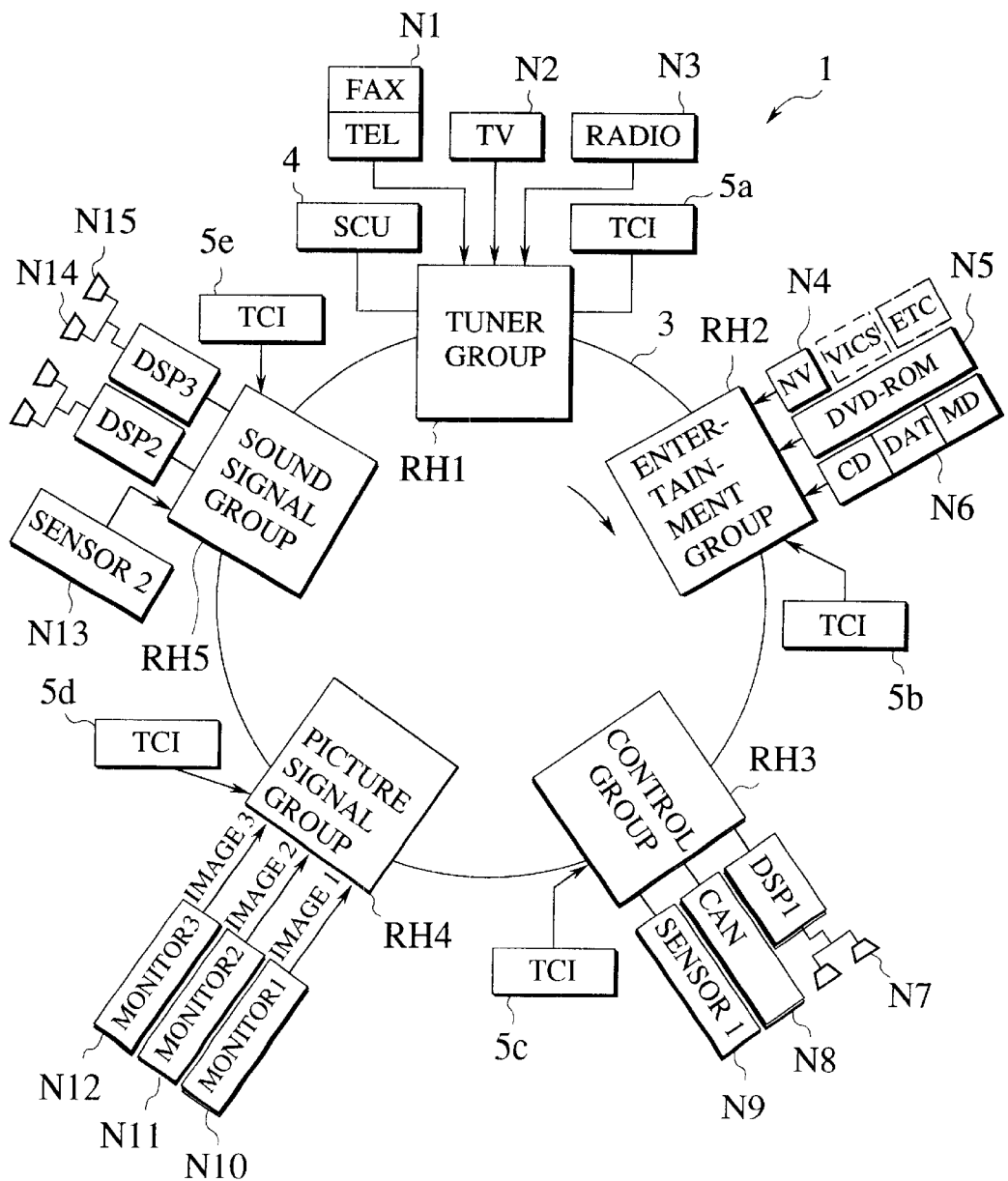
FIG. 2 is a block diagram showing the whole of the communication system of the embodiment.

At first, as shown in FIG. 2, the communication system 1 of the invention includes a plurality of route hubs RH1, RH2, RH3, RH4, RH5 as repeating devices, which are linked to each other through the intermediary of a loop-type data transmission path 3. Connected to the route hub RH1 is a system control unit (SCU) 4 which supervises synchronous control etc. of the whole communication system 1. Note, as the network-topology for the communication system 1, a path of appropriate type, such as bus-type or star-type, may be adopted in place of the shown loop-type path.

Respectively connected to each of the plural route hubs RH1, RH2, RH3, RH4, RH5 are one or more various functional instruments N1 to N15 which constitute node terminals of the invention, as objects to be connected. All of the route hubs RH1–RH5 and the functional instruments N1–N15 are connected to each other through the data transmission path 3 for mutual exchange of data. For the functional instruments N, for example, a portable telephone, a facsimile (FAX), a digital TV, a radio receiver, a navigation (NV) apparatus, a monitor for Vehicle Information and Communication System (VICS), a device for communicating information about charges between a vehicle and an Electrical Toll Collection System (ETC), a Digital Video Disc (DVD) unit, a ROM unit, a Compact Disc (CD)-ROM unit, a Digital Audio Tape recorder (DAT), a Mini Disc Player (MD), an audio amp having a Digital Signal Processor (DSP) installed therein, a Controller Area Network (CAN) interface, a variety of sensors (e.g. direction sensor, vehicle speed sensor), a monitoring device and various functional devices such as a personal computer on board etc., can be employed. Note, in general, the VICS monitor and the ETC device are defined as instruments for additional functions for the NV apparatus. The respective route hubs RH1–RH5 are divided for every functions: a tuner group for receiving wireless waves for TV, radio etc. through the functional instruments N such as a television set; an entertainment group for providing aural signals, video signals, traffic informations etc. through the functional instrument such as the NV apparatus; a control group for providing control informations etc. through the functional instruments such as the various sensors; a picture signal group for providing picture signals to the monitoring instruments etc.; a sound signal group for providing aural signals to an audio amplifier having a digital signal processor (DST) or the like.

The route hubs RH1–RH5 and the functional instruments N1–N15 have their inherent addresses established in advance, as described later. When the exchange of data is executed among the functional instruments N1–N15, among the route hubs RH, or executed between the specified functional instrument N and the specified route hub RH through the data transmission path 3, the above addresses are used in order to designate the senders or the receivers.

In order to memorize address commands in each of the plural route hubs RH and the functional instruments N, Terminal Connection Information setting (TCI) devices 5a, 5b, 5c, 5d, 5e, such as microcomputers, are connected to the route hubs RH1–RH5, respectively. The TCI devices 5a, 5b, 5c, 5d, 5e are constituted so as to store terminal connection informations composed of all addresses of the route hubs RH1–H5 in the communication system 1 and commands for terminal address of all functional instruments N1–N15 connected to the route hubs RH1–RH5.

Consequently, the terminal connection informations stored in the TCI devices 5a, 5b, 5c, 5d, 5e can be transferred to the respective route. hubs RH1–RH5.

Figure 1:
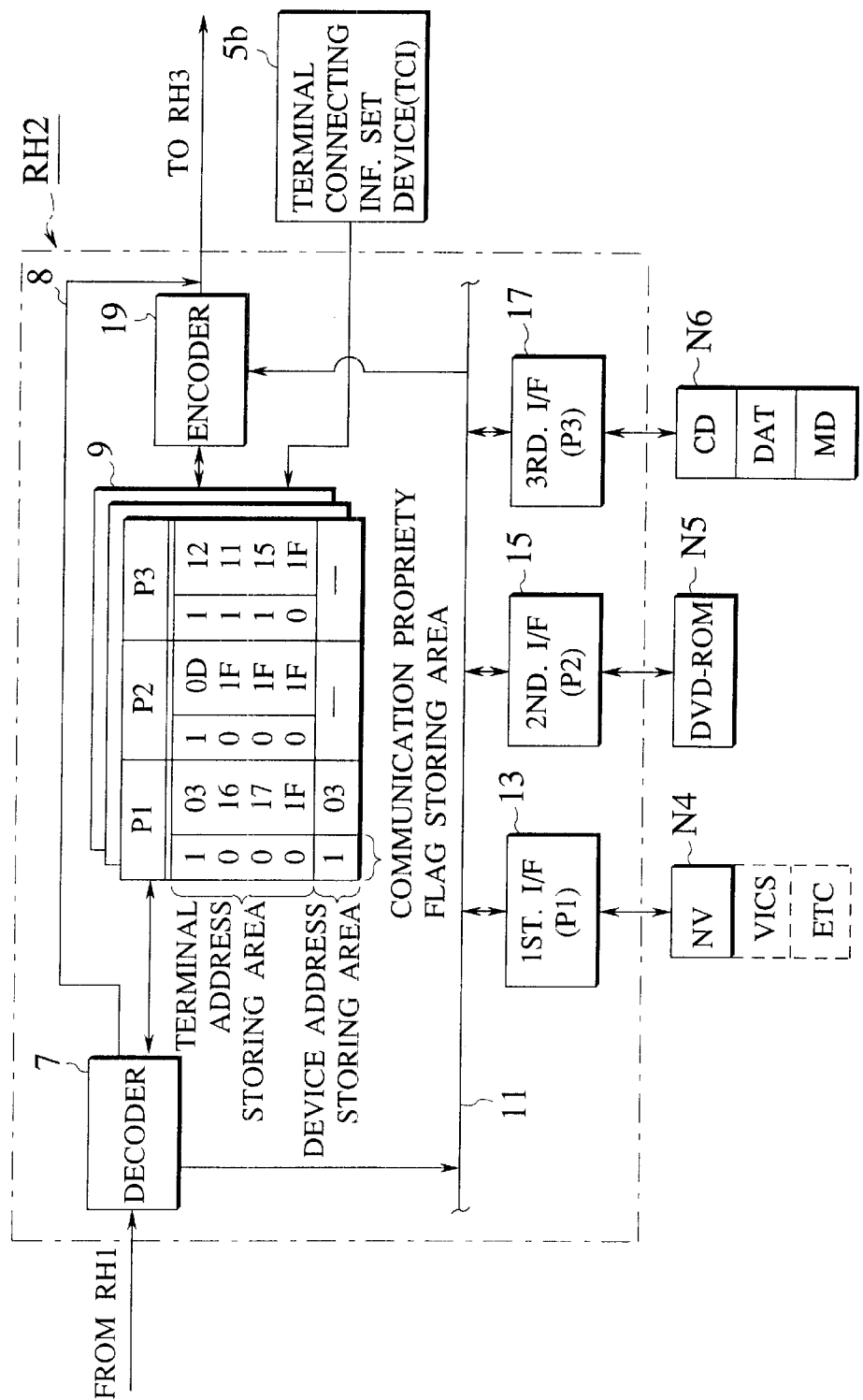
FIG. 1 is a block diagram showing an essential part of a communication system in accordance with an embodiment of the present invention.

Taking example by the route hub RH2, we now describe the block constitution of each route hub as the repeating device with reference to FIG. 1. The route hub RH2 comprises the following elements:

a decoder 7 for receiving communication data sent from the route hub RH1 on the upstream side of the hub RH2 through the data transmitting path 3 and executing a predetermined process;

a bypass route 8 for allowing the received communication data to bypass various functional elements in the route hub RH2 when a destination address of the communication data received by the decoder 7 is not included in anyone of the functional instruments N4, N5 and N6;

a RAM 9 as terminal address storing means, device address storing means and communication propriety storing means;

first to third interface (I/F) units 13, 15, 17 connected to the functional instruments N4, N5, N6, respectively;

a data bus 11 used in the data communication among the functional instruments in the route hub 2; and an encoder 19 as header information adding means, for inputting the communication data fed from the functional instruments N4, N5, N6 or generated in the route hub RH2 itself, sequent executing the predetermined process for the inputted communication data and finally sending the communication data after processing toward the route hub RH3 on the downstream side through the data transmitting path 3.

Besides storing the terminal connection information fed from the TCI 5b, the RAM 9 stores informations about setting conditions of communication propriety flags for representing whether the respective communication terminals are under its communicable condition or not, corresponding to the route hub RH2 and the respective communication terminals including the functional instruments N4, N5, N6 connected to the route hub RH2. Regarding situation of the communication propriety flags, for example, when the corresponding communication terminal is under its communicable condition, the flag is set to 1. While, when the corresponding communication terminal is under its incommunicable condition, the flag is set to 0. Note, in this specification, the above "incommunicable" condition in the communication terminal means, for example, a situation that the functional instrument N4 is disconnected to the route hub RH2, a case that the communication terminal is getting ready for connection, an abnormal condition that the communication terminal has a malfunction or the like.

Referring to FIG. 1, we now describe contents stored in the RAM 9 in detail.

In the RAM 9, the address informations of the communication terminals relating to the corresponding route hub RH and unit tables containing the communication propriety condition are memorized as many as the numbers of the route hubs. Each of the unit tables is constituted by the following elements:

a terminal address storing area for storing one or more terminal addresses where specific values are established every functional instruments N4, N5, N6 connected to first to third input/output ports P1, P2, P3 in the first to third interface units 13, 15, 17, respectively;

a device address storing area for storing a device address which is a specific value for each route hub RH and distinguishable from the terminal address; and a communication propriety flag storing area for storing the information about situations of a communication propriety flag, corresponding to the respective communication terminals.

Note, the terminal addresses and the device address stored in the RAM 9 as the terminal connecting information are established to inherent address values respectively, so that the respective addresses are distinguishable from each other.

The decoder 7 includes the following functions:

a communication data receiving function to receive the communication data fed from the route hub RH1 on the upstream side through the data transmitting path 3;

a decoding function to decode the sender/destination information containing the address of the sender and the address of the destination, which has been attached to the received communication data, by referring to the terminal connecting information stored in the RAM 9;

a destination judging function to judge whether the received communication data is directed to any one of the communication terminals concerning with the route hub RH2, in. detail, whether the destination address of the received communication data coincides with the device address of the route hub RH2 or coincides with one of the respective terminal addresses of the functional instruments N4, N5, N6 connected to the route hub RH2;

(for a case that the received communication data is directed to one of the communication terminals related to the route hub RH2, which will be referred "destined communication terminal", hereinafter)

a communicating condition judging function to judge whether or not the destined communication terminal is under its communicable condition, referring to information about communicating condition of the destined communication terminal, which is stored in the RAM 9;

(for a case that the received communication data is not directed to any one of the communication terminals related to the route hub RH2)

a communication data by-pass function to bypass the received communication data toward the route hub RH3 on the downstream side through the bypass route 8;

(for a case that the destined communication terminal is under the communicable condition)

a destination route feeding function, to feed the received communication data to a route for the nominated destination;

(for a case that the destined communication terminal is under the incommunicable condition)

an incommunicable-notice replying function, to reply a notice of impossibility for the destined communication terminal to communicate toward the sender; and (for a case that a functional instrument N is connected to the route hub RH2 additionally)

a communication propriety rewriting function to rewrite the communication propriety condition of the added functional instrument N from its incommunicable state to the communicable state.

Besides inputting the communication data including source data (e.g. control data, sound data, image data etc.) supplied from the functional instruments N4, N5, N6, applying a predetermined converting process on the inputted communication data and sequent outputting the converted communication data to the common data bus 11, each of the first to the third I/F units 13, 15, 17 has various functions to input the communication date fed from the decoder 7 through the data bus 11, apply a predetermined inverting process on the inputted communication data and finally output the inverse communication data toward the nominated communication terminal.

Inputting the communication data fed from the functional instruments N4, N5, N6 or the same generated in the route hub RH2 itself, the encoder 19 operates to add the sender/destination information to the inputted communication data while referring to the terminal connecting information stored in the RAM 9 and also send the resulting communication data with the added sender/destination information to the route hub RH3 on the downstream side through the data transmitting path 3. Note, the sender/destination information includes identifiers (described later) for identifying sorts of the sender and the destination and the respective addresses.

Hereat, it is noted that FIG. 1 shows an arrangement where three kinds of functional instruments N6 of the CD-ROM unit, the DAT unit and the MD unit are connected to the third I/O port P3 of the third interface unit 17. In this way, on the assumption that even when a plurality of functional instruments are connected to one I/O port, an inherent address can be established to each instrument, the capacity of terminal address storing area with respect to one I/O port is ensured so as to store, for example, four kinds of terminal addresses.

Meanwhile, FIG. 1 also shows a condition that only one functional instrument N4, i.e. the NV apparatus, is associated with the first I/O port P1 of the first interface unit 13 practically and any other additional instrument for the NV apparatus (e.g. the VICS monitor, the ETC device) has not been associated with the NV apparatus yet, as represented by broken lines of FIG. 1.

In this case, as shown in FIG. 1 where an address "16H" is set to the VICS monitor while an address "17H" is set to the ETC device, the present system is preferably arranged so that, upon establishing inherent terminal addresses for the additional instruments and also initializing the incommunicable conditions of the additional instruments in advance, when the respective additional instruments are connected to the NV apparatus, then the communication propriety conditions are rewritten from their incommunicable conditions to the communicable conditions. With the above arrangement, even when the respective additional instruments are connected after the NV apparatus has been connected to the I/O port P1, it is possible to eliminate any steps to provide new addresses to the additional instruments. The arrangement further allows the system to recognize each of the additional instruments as one of the functional instruments N in connection with the route hub RH2 at the same time of connecting the additional instrument to the NV apparatus. Furthermore, according to the arrangement, since the inherent addresses are previously established in consideration of the presence of functional instruments which may be additionally connected to the NV apparatus, it is possible to simplify the management of address in the communication system. Moreover, since the communication system of the invention is constructed irrespective of connection of the additional instruments on the assumption that all of the existing communication terminals including the additional instruments are connected to the system, it is possible to accomplish the design of hardware and software with ease.

Although the communication system of the invention is illustrative of the shown embodiment where the VICS monitor and the ETC device in association with the NV apparatus are employed as the additional instruments to be connected with the route hub RH2, the present invention is not limited to the embodiment but any other additional instruments which may be connected to a certain route hub RH.

In this way, according to the communication system of the present invention, the inherent terminal addresses have been established for the additional instruments having likelihood of being additionally connected to the repeating devices in advance, while the communication propriety conditions of the additional instruments have been initialized to their incommunicable conditions in advance, too. Further, the communication system is so constructed that, when the additional instruments are connected to the repeating devices, then the communication propriety conditions are rewritten from their incommunicable conditions to the communicable conditions. Accordingly, even if the additional instruments are additionally connected to the repeating devices after being connected to the communication system, it is possible to eliminate some steps of providing such additional instruments with new addresses and allows the system to recognize each of the additional instruments as one of some functional instruments connected with the repeating devices instantly. As a result, it is possible to realize the communication system which is capable of eliminating the complicated procedure for giving the addresses and bringing the additional instruments into their communicable conditions instantly, namely, effecting the plug and play function.

Moreover, by diverting the terminal address of one functional instrument selected from one or more functional instruments, which are respectively connected to every route hubs RH, in accordance with a predetermined selection rule, it is also possible to establish the selected device address and store it in the device address storing area. For example, when the respective terminal addresses of the functional instruments N connected to the I/O ports P1–P3 are established in form of specific codes shown in FIG. 5 or FIG. 6 beforehand, the device address for each route hub can be determined by applying an appropriate rule for selection on the set values of the terminal addresses. (e.g. a maximum of the set values, the minimum, a set value of the functional instrument N connected to the I/O port P1 etc.)

Giving an example illustrative of the route hub RH2, we now describe operations of the respective route hubs RH constituting the communication system 1 of the invention.

At first, the decoder 7 of the route hub RH2 operates to decode the sender/destination information added to the received communication data with reference to the terminal connecting information stored in the RAM 9. Next, on the basis of the decoded sender/destination information, the decoder 7 judges whether or not the destination address of the received communication data coincides with either one of the device address of the route hub RH2 and the respective terminal addresses of the functional instruments N4, N5, N6. Consequently, it is judged by the decoder 7 whether the received communication data is directed to the communication terminals related to the route hub RH2 (including the instruments N4, N5, N6).

Then, as the result of judgement of the destination, when the received communication data is directed to any one of the communication terminals related to the route hub RH2, the decoder 7 judges whether the destined communication terminal is under the communicable condition, referring to the information about communicable condition of the destined communication terminal stored in the RAM 9. On the contrary, when the received communication data is not directed to any one of the communication terminals related to the route hub RH2, the decoder 7 operates to feed the received communication data toward the route hub RH3 on the downstream side through the bypass route 8.

Again, when the destined communication terminal is under the communicable condition, the decoder 7 further operates to feed the received communication data to the route for the nominated destination. On the other hand, when the destined communication terminal is under the incommunicable condition, the decoder 7 operates to reply the notice of impossibility for the destined communication terminal to communicate (i.e. notice of incommunicable) toward the sender.

Note, when an additional instrument N is connected to the route hub RH2, the decoder 7 also operates to rewrite the communication propriety condition of the added functional instrument N from its incommunicable state to the communicable state.

In the meantime, since the communication system 1 of the invention allows the communication propriety conditions of the communication terminals to be rewritten timely, the system 1 is constructed in a manner that the notice of incommunicable is not stored in either of the sender and the destination. Thus, it might be supposed that, in such a case, the communication terminal as the sender tries to communicate with the communication terminal as the destination until the communication is accomplished, repeatedly. However, according to the embodiment, the sending communication terminal to which the notice of incommunicable is replied is adapted so as to stop to communicate with the destined communication terminal when the communication does not succeed in spite of repeating the try of communication by predetermined times at regular intervals. Therefore, it is possible to reduce a volume of data transmitted.

Figures 3, 4:
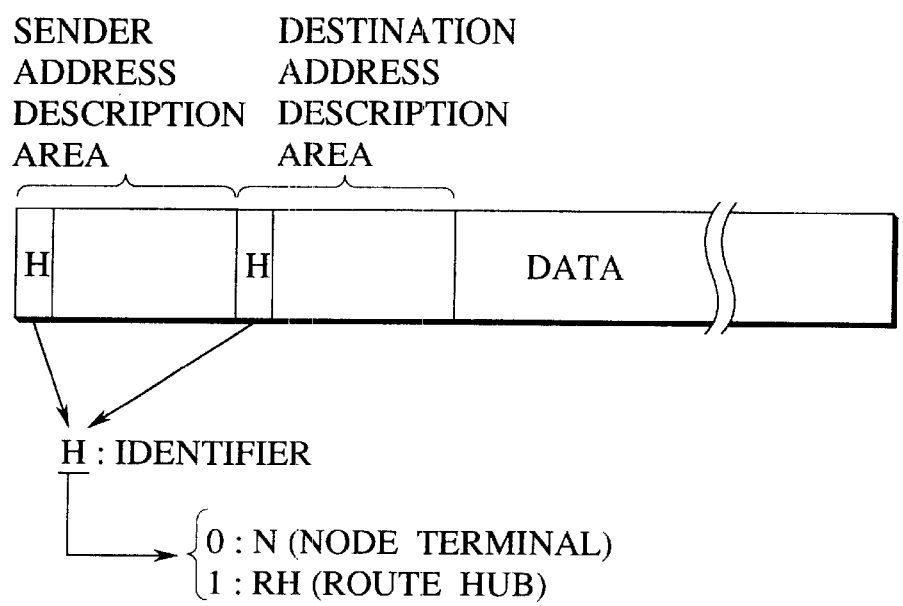
FIG. 3 is a diagram showing a data format used for the communication system of the embodiment.
FIG. 4 is a diagram for explanation of the invention.

Referring to FIGS. 3 and 4, we describe a data format of the communication data fed from each route hub RH.

Established in a communication frame of the communication data as an object to be transmitted are an identifier description area (e.g. one bit length) for describing an identifier H which will be used in identifying the kind of the sender (or the destination), i.e., which of the functional instrument N and the route hub RH the communication data is related to, and an address description area (e.g. nine bit length) for describing either one of the terminal address of the functional instrument N concerned and the address of the route hub RH concerned.

Accordingly, when transmitting the communication data from each route hub RH, the encoder 19 operates to describe as to which is the sender (or the destination), the functional instrument N or the route hub RH, in the identifier description area formed in the communication frame for the communication data by the identifier H while referring to the terminal connecting information stored in the RAM 9. Additionally, upon selecting the address of the sender (or the destination) from either one of the terminal address of the functional instrument N and the device address of the route hub RH, the encoder 19 describes the selected one in the address description area in the communication frame and transmits the communication data with the sender (or the destination) information including the identifier and the address from the route hub RH to the destination.

On the contrary, when the route hub RH receives the communication data, the decoder 7 identifies as to which is the destination, the functional instrument N or the route hub RH, by using the identifier H while referring to the terminal connecting information stored in the RAM 9 and also judges whether the address of the concerned route hub RH itself or the functional instrument N connected thereto is nominated as the destination address. Based on the above judgement, then the decoder 7 selects a route for the nominated destination or the bypass route for by-passing the concerned route hub RH and feeds the communication data into the selected route.

In this way, according to the invention, the data format in the communication system is constructed so as to make it possible to identify the sorts of the sender and the destination as to which is the route hub RH as the repeating device or the functional instrument N as the node terminal by using the identifier H of short bit length and possible to identify the address of the route hub RH or the functional instrument N by using the device address or the terminal address stored in the address description area. Therefore, in case of the data communication between the functional instruments, it is possible to shorten the bit length required for designating the address as a whole. Consequently, it is possible to transmit the communication data from the sender to the nominated destination without reducing the data volume transmitted per unit time, certainly.

Finally, it will be understood by those skilled in the art that the foregoing description is one of preferred embodiments of the communication system, and that various changes and modifications may be made to the present invention without departing from the spirit and scope thereof. That is, although the communication system of the invention is an example illustrative of the application of the communication system on the network on vehicle where various functional instruments on board are connected with each other through the data transmitting path, the present invention is applicable to every form of the network while the invention is limited to the shown embodiment.

What is claimed is:

1. A communication system comprising:

a plurality of repeating devices each having one or more node terminals connected thereto, said repeating devices being connected with each other through a data transmitting path, whereby end-to-end data communication is carried out between said node terminals, between said repeating devices, and between said node terminals and said repeating devices, said repeating devices each comprising:

node terminal address storage configured to store node terminal addresses established to inherent values for said node terminals, respectively;

repeating device address storage configured to store a repeating device address established to an inherent value for said repeating device concerned and established to be distinguishable from said node terminal addresses; and a header information adder configured to add sender/destination information that identifies a sender node terminal or a sender repeating device, or a destination node terminal or a destination repeating device, to communication data which has been fed from said repeating device concerned or said one or more node terminals connected thereto, and to send said communication data with said sender/destination information toward said data transmitting path;

wherein said sender/destination information includes either one of a node terminal address stored in said node terminal address storage, and a repeating device address stored in said repeating device address storage.

2. A communication system comprising a plurality of repeating devices each having one or more node terminals connected thereto, said repeating devices being connected with each other through a data transmitting path, whereby end-to-end data communication is carried out between said node terminals, between said repeating devices, or between said node terminals and said repeating devices, said repeating devices each comprising:

node terminal address storage configured to store node terminal addresses established to inherent values for said node terminals, respectively;

repeating device address storage configured to store a repeating device address established to an inherent value for said repeating device concerned and established to be distinguishable from said node terminal addresses; and a header information adder configured to add sender/destination information of a sender or a destination to communication data which has been fed from said repeating device concerned or said one or more node terminals connected thereto, said header information adder sending said communication data with said sender/destination information toward said data transmitting path;

wherein said sender/destination information includes:
an identifier configured to identify which of said node terminal and said repeating device said sender or said destination of said communication data is related to; and
either one of said node terminal address stored in said node terminal address storage and said repeating device address stored in said repeating device address storage.

3. A communication system comprising a plurality of repeating devices each having one or more node terminals connected thereto, said repeating devices being connected with each other through a data transmitting path, whereby end-to-end data communication is carried out between said node terminals, between said repeating devices, or between said node terminals and said repeating devices, said repeating devices each comprising:
node terminal address storage configured to store terminal addresses established to inherent values for said node terminals, respectively;
repeating device address storage configured to store a terminal address of one node terminal as a device address, said one node terminal being selected from said one or more node terminal in accordance with a predetermined selection rule; and
a header information adder configured to add sender/destination information of a sender or a destination to communication data which has been fed from said repeating device concerned or said one or more node terminals connected thereto, said header information adder sending said communication data with said sender/destination information toward said data transmitting path;
wherein said sender/destination information includes:
an identifier configured to identify which of said node terminal and said repeating device said sender or said destination of said communication data is related to; and
either one of said terminal address stored in said terminal address storage and said device address stored in said device address storage.

4. A communication system as claimed in claim 3, wherein said predetermined selection rule is established on a basis of a set value of said node terminal address optionally.

5. A repeating device configured to have one or more node terminals connected thereto and configured to be connected with other said repeating devices through a data transmitting path in a communication system,
whereby end-to-end data communication is carried out between said node terminals, between said repeating devices, and between said node terminals and said repeating devices,
said end-to-end data communication being carried out in a communication frame format that includes an address description area established in communication frames as objects to be transmitted, the address description area describing either a node terminal address established to an inherent value for each of said node terminals or a repeating device address established to an inherent value for each of said repeating devices and distinguishable from any node terminal address.

6. A repeating device configured to have one or more node terminals connected thereto and configured to be connected with other said repeating devices through a data transmitting path,
whereby end-to-end data communication is carried out between said node terminals, between said repeating devices, or between said node terminals and said repeating devices, said end-to-end data communication being carried out in a frame format comprising:
an identifier description area describing an identifier configured to identify which of said node terminals and said repeating devices a sender or a destination of said communication data is related to; and
an address description area describing either a node terminal address established to an inherent value for each of said node terminals or a repeating device address established to an inherent value for each of said repeating devices.

7. A repeating device as claimed in claim 6, wherein said repeating device address has a node terminal address of one node terminal established as a repeating device address, said one node terminal being selected from said one or more node terminals in accordance with a predetermined selection rule.

8. A repeating device as claimed in claim 7, wherein said predetermined selection rule is established on a basis of a set value of said node terminal address optionally.

9. A communication system comprising a plurality of repeating devices each having one or more node terminals connected thereto, said repeating devices being connected with each other through a data transmitting path, whereby data communication is carried out between said node terminals, between said repeating devices, or between said node terminals and said repeating devices, said repeating devices each comprising:
node terminal address storage configured to store node terminal addresses established to inherent values for said node terminals, respectively; and
communication propriety storage configured to store respective communication propriety conditions as to whether each of said node terminals connected to said repeating device concerned is in a communicable condition or an incommunicable condition;
wherein said terminal addresses stored in said terminal address storage include a terminal address with respect to an additional node terminal configured to be connected to said repeating device concerned additionally, while said communication propriety condition of said additional node terminal stored in said communication propriety storage is initialized to the incommunicable condition.

10. A communication system as claimed in claim 9, wherein each of said repeating devices further comprises communication propriety rewriting means for rewriting said communication propriety condition of said additional node terminal from the incommunicable condition to the communicable condition when said additional node terminal is connected to said repeating device concerned.

11. A communication system as claimed in claim 9, wherein each of said repeating devices further comprises incommunicable notice replying means for replying an incommunicable notice representing that said node terminal concerned is under the incommunicable condition toward a sender of said communication data when receiving communication data directed to a node terminal under the incommunicable condition.

12. A communication system comprising a plurality of repeating devices each having one or more node terminals connected thereto, said repeating devices being connected with each other through a data transmitting path, whereby data communication is carried out between said node terminals, between said repeating devices, or between said node terminals and said repeating devices, said repeating devices each comprising:
  node terminal address storage configured to store terminal addresses established to inherent values for said node terminals, respectively; and
  communication propriety storage configured to store respective communication propriety conditions as to whether communication terminals including said repeating device and said one or more node terminal connected to said repeating device are under respective communicable or incommunicable conditions;
  wherein said terminal addresses stored in said terminal address storage include a terminal address with respect to an additional node terminal configured to be connected to said repeating device concerned additionally, while said communication propriety condition of said additional node terminal stored in said communication propriety storage is initialized to the incommunicable condition.

13. A communication system as claimed in claim 12, wherein each of said repeating devices further comprises communication propriety rewriting means for rewriting said communication propriety condition of said additional node terminal from the incommunicable condition to the communicable condition when said additional node terminal is connected to said repeating device concerned.

14. A communication system as claimed in claim 13, wherein said communication propriety storage operates to rewrite said communication propriety condition of said communication terminal concerned from the communicable condition to the incommunicable condition when any one of said communication terminals falls into the incommunicable condition.

15. A communication system as claimed in claim 12, wherein each of said repeating devices further comprises incommunicable notice replying means for replying an incommunicable notice representing that said node terminal concerned is under the incommunicable condition toward a sender of said communication data when receiving communication data directed to a node terminal under the incommunicable condition.

16. A communication system comprising:
  a plurality of repeating devices each having one or more node terminals connected thereto, said repeating devices being connected with each other through a data transmitting path, whereby data communication is carried out between said node terminals, between said repeating devices, or between said node terminals and said repeating devices, said repeating devices each comprising:
    node terminal address storage configured to store node terminal addresses established to inherent values for said node terminals, respectively;
    repeating device address storage configured to store a repeating device address established to an inherent value for said repeating device concerned and established to be distinguishable from said node terminal addresses; and
    a header information adder configured to add sender/destination information that identifies a sender node terminal or a sender repeating device, or a destination node terminal or a destination repeating device, to communication data that has been fed from said repeating device concerned or said one or more node terminals connected thereto, and to send said communication data with said sender/destination information toward said data transmitting path;
    wherein said sender/destination information includes either one of a node terminal address stored in said node terminal address storage and a repeating device address stored in said repeating device address storage; and
    wherein the sender/destination information further includes first and second identifier fields having respective lengths shorter than lengths of the node terminal addresses and the repeating device addresses, each of the first and second identifier fields specifying whether an associated address is a node terminal address or a repeating device address.

17. A communication system comprising:
  a plurality of repeating devices each having one or more node terminals connected thereto and connected with each other through a data transmitting path, whereby data communication is carried out between said node terminals, between said repeating devices, and between said node terminals and said repeating devices,
  said data communication being carried out in a communication frame format that includes an address description area established in communication frames as objects to be transmitted, the address description area describing at least one of a node terminal address established to an inherent value for each of said node terminals and a repeating device address established to an inherent value for each of said repeating devices and distinguishable from any node terminal address; and first and second identifier fields having respective lengths shorter than lengths of the node terminal addresses and the repeating device addresses, each of the first and second identifier fields specifying whether an associated address is a node terminal address or a repeating device address.

18. An encoder configured to assemble communication frames as objects to be transmitted from a repeating device, each repeating device configured to have one or more node terminals connected thereto and configured to be connected with other said repeating devices through a data transmitting path, each communication frame including:
  an address description area describing either a node terminal address established to an inherent value for each of said node terminals or a repeating device address established to an inherent value for each of said repeating devices and distinguishable from any node terminal address, and
  an identifier description area describing an identifier configured to identify which of said node terminals and said repeating devices a sender or a destination of said communication data is related to;
  whereby end-to-end data communication is carried out between said node terminals, between said repeating devices, and between said node terminals and said repeating devices.

19. The encoder of claim 18, wherein the address description area further includes:
  first and second identifier fields having respective lengths shorter than lengths of the node terminal addresses and the repeating device addresses, each of the first and second identifier fields specifying whether an associated address is a node terminal address or a repeating device address.

20. An encoder configured to assemble communication frames as objects to be transmitted from a repeating device, each repeating device configured to have one or more node terminals connected thereto and configured to be connected with other said repeating devices through a data transmitting path, each communication frame including:
  an address description area describing either a node terminal address established to an inherent value for each of said node terminals or a repeating device address established to an inherent value for each of said repeating devices, and identifiers of shorter bit length than the address description area, configured to identify whether an associated address description area describes a node terminal address or a repeating device address, whereby data communication is carried out between said node terminals, between said repeating devices, and between said node terminals and said repeating devices.

21. An encoder as claimed in claim 20, wherein said repeating device address has a node terminal address of one node terminal established as a repeating device address, said one node terminal being selected from said one or more node terminals in accordance with a predetermined selection rule.

22. An encoder as claimed in claim 21, wherein said predetermined selection rule is established on a basis of a set value of said node terminal address optionally.

* * * * *